United States Patent
Chen et al.

(10) Patent No.: US 12,512,556 B2
(45) Date of Patent: Dec. 30, 2025

(54) FLAME-PROOF PORTABLE POWER SUPPLY

(71) Applicant: POWER ON TOOLS CO., LTD, Xiamen (CN)

(72) Inventors: Xun Chen, Xiamen (CN); Zhangxun Weng, Xiamen (CN); Xia Li, Xiamen (CN); Yubing Zhu, Xiamen (CN)

(73) Assignee: POWER ON TOOLS CO., LTD, Xiamen (CN)

( * ) Notice: Subject to any disclaimer, the term of this patent is extended or adjusted under 35 U.S.C. 154(b) by 486 days.

(21) Appl. No.: 18/098,080

(22) Filed: Jan. 17, 2023

(65) Prior Publication Data

US 2024/0178514 A1    May 30, 2024

(30) Foreign Application Priority Data

Nov. 30, 2022    (CN) .......................... 202211519747.9

(51) Int. Cl.
| | |
|---|---|
| *H01M 50/383* | (2021.01) |
| *H01M 10/48* | (2006.01) |
| *H01M 50/224* | (2021.01) |
| *H01M 50/581* | (2021.01) |

(52) U.S. Cl.
CPC ....... *H01M 50/383* (2021.01); *H01M 10/486* (2013.01); *H01M 50/224* (2021.01); *H01M 50/581* (2021.01)

(58) Field of Classification Search
CPC ............. H01M 50/383; H01M 50/581; H01M 50/224; H01M 10/48; H01M 10/486
See application file for complete search history.

(56) References Cited

U.S. PATENT DOCUMENTS

2021/0249639 A1*    8/2021    Shao ................... H01M 10/486

FOREIGN PATENT DOCUMENTS

CN          113963309 A  *  1/2022  ........... G06F 3/0412

\* cited by examiner

*Primary Examiner* — Karie O'Neill Apicella

(57) ABSTRACT

A flame-proof portable power supply includes a battery pack, an electrical assembly, a metal housing and an aerosol fire extinguishing device. A holding cavity for installing the battery pack or the electrical assembly are formed in the metal housing, the battery pack is electrically connected to the electrical assembly, and the battery pack is directly connected to the metal housing. The aerosol fire extinguishing device is disposed in a holding cavity, and the aerosol fire extinguishing device is configured to release aerosol in the holding cavity when temperature in the holding cavity reaches a specified temperature value.

11 Claims, 7 Drawing Sheets

FLAME-PROOF PORTABLE POWER SUPPLY

TECHNICAL FIELD

The present disclosure relates to a technical field of energy storage power supplies, and in particular to a flame-proof portable power supply.

BACKGROUND

Electric energy is an essential production factor in an industrial field, in special environments, many operations cannot continue without supply of electric energy. Conventionally, electric generators are configured to supply electric energy, but the electric generators are inconvenient to carry because of large sizes. Therefore, a portable power supply appears. Existing portable power supplies generally provide electric energy for a terminal device through storing electric energy and releasing electric energy by a battery pack. However, in a process of discharging or charging of the existing portable power supplies, the battery pack easily heats up, and the battery pack may generate a large amount of heat release especially when the circuit is short-circuited. Moreover, the battery pack is easy to burn when generating an excessive amount of heat release, thereby causing the power supply damaged, meanwhile, the safety of surrounding industrial equipment is further threatened, and great safety risks are brought to users.

In general, each of the existing portable power supplies is provided with a holding cavity and dissipates heat through a fan. Dissipating the heat using the fan exists a problem that waterproof performance is insufficient since a position where an air inlet or an air outlet of the fan is disposed cannot be sealed. Moreover, when the battery pack instantaneously burns inside to generate a large amount of heat, the fan cannot extinguish open fires, which still exists great safety risks, meanwhile, the battery pack and the electrical assemblies are provided in the same holding cavity, so that once the battery is on fire, the electrical assemblies are also easy to burn quickly.

SUMMARY

The present disclosure provides a flame-proof portable power supply, which has a simple structure and is convenient to operate, aiming at solving problems that the existing portable power supplies have poor fireproof performance and are difficult to extinguish the open fires when the power supply burns inside.

The present disclosure provides the flame-proof portable power supply, including a battery pack, an electrical assembly, a metal housing, and an aerosol fire extinguishing device. A holding cavity for installing the battery pack and the electrical assembly is formed in the metal housing, the battery pack is electrically connected to the electrical assembly, and the battery pack is directly connected to the metal housing. The aerosol fire extinguishing device is disposed in the holding cavity, and the aerosol fire extinguishing device is configured to release aerosol in the holding cavity when temperature in the holding cavity reaches a specified temperature value.

Furthermore, the holding cavity includes a first holding cavity and a second holding cavity. The battery pack is disposed in the first holding cavity, the battery pack is directly connected to the metal housing, and the electrical assembly is disposed in the second holding cavity. The aerosol fire extinguishing device is disposed in the first holding cavity, and the aerosol fire extinguishing device is configured to release the aerosol in the first holding cavity when temperature in the first holding cavity reaches the specified temperature value.

Furthermore, the metal housing includes a partition plate, an outer peripheral wall of the partition plate extends in opposite directions from both sides to form a first perimeter wall of the first holding cavity and a second perimeter wall of the second holding cavity, and the first perimeter wall and the second perimeter wall respectively transfer heat from the first holding cavity and the second holding cavity to external air.

Furthermore, a plurality of buffer posts for receiving impact from an upper housing of the metal housing are annularly disposed in the second holding cavity along an inner side of the second peripheral wall of the second holding cavity, and a first end of each of the plurality of the buffer posts is fixed on the partition plate and a second end of each of the plurality of the buffer posts is connected to the upper housing of the metal housing. Each of the plurality of the buffer posts includes a post body, and a long-striped through hole is defined on a middle portion of the post body of each of the plurality of the buffer posts to form an elastic support arm for buffering.

Furthermore, protective tubes are disposed on surfaces of two opposite outer sides of the metal housing in splay shapes for supporting in either directions, so that the metal housing has a certain distance from a placing plane when being placed.

Furthermore, each of the protective tubes includes a first protective tube and a second protective tube, the first protective tube is disposed on the upper housing of the metal housing in a first splay shape, and the second protective tube is disposed on a lower housing of the metal housing in a second splay shape.

Furthermore, the aerosol fire extinguishing device includes a temperature sensor, a control device, and an aerosol storage device. The control device is connected to the temperature sensor and the aerosol storage device, and the control device is electrically connected to the electrical assembly. The electrical assembly includes a main control board and a plurality of output interfaces, the main control board is electrically connected to the battery pack, and the main control board is electrically connected to the plurality of the output interfaces. The main control board is configured to:

obtain a temperature and an output power of the battery pack at current moment;

obtain temperatures of the battery pack at multiple historical moments at the output power;

fit the temperature of the battery pack at the current moment and the temperatures of the battery pack at the multiple historical moments to obtain a curve of temperatures of the battery pack changing with time at the output power;

estimate a time interval required for the battery pack to reach a set temperature value according to the curve of the temperatures of the battery pack changing with time at the output power, and the set temperature value is less than the specified temperature value;

send a warning alert when the time interval required for the battery pack to reach the set temperature value is less than a first set time interval and greater than or equal to a second set time interval;

obtain output interfaces currently in an output state and a priority of each of the output interfaces currently in the output state when the time interval required for the battery pack to reach the set temperature value is less than the second set time interval; and control an output interface having a lowest priority to stop outputting voltage or control the aerosol fire extinguishing device to release the aerosol.

Furthermore, the first set time interval is inversely proportional to the output power of the battery pack, and the second set time interval is inversely proportional to the output power of the battery pack.

Furthermore, the main control board is further configured to:

monitor the temperature of the battery pack at the current moment;

obtain an instantaneous temperature change rate of the battery pack according to the temperature of battery pack at the current moment and a temperature of the battery pack at a previous moment; and control all of the plurality of the output interfaces to stop outputting the voltage or control the aerosol fire extinguishing device to release the aerosol when the instantaneous temperature change rate of the battery pack is greater than a preset change threshold of a temperature change rate of the battery pack.

Furthermore, a safety port is defined on the first holding cavity, a safety cover is disposed on the safety port, and a temperature sensing pack is disposed below the safety cover. The temperature sensing pack includes a pushing rod, and the pushing rod is configured to push the safety cover to open or close the safety port according to temperature changes in the first holding cavity, and the temperature sensing pack is disposed on the battery pack.

Furthermore, a total mass of aerosol generating agent contained in the aerosol fire extinguishing device and a space volume of the first holding cavity satisfy a relationship of $0.001 \text{ g/L} \leq A/B \leq 0.1 \text{ g/L}$, where A is the total mass of the aerosol generating agent, and B is the space volume of the first holding cavity.

The present disclosure provides the flame-proof portable power supply, the metal housing where the battery pack is disposed in is sealed, thereby providing waterproof for the battery pack. Meanwhile, the battery pack is directly connected to the metal housing, the heat generated by the battery pack is transferred to the external air through the metal housing, thereby achieving heat dissipation without use of the fan. Moreover, the aerosol fire extinguishing device is disposed in the first holding cavity where the battery pack is disposed in, and the aerosol fire extinguishing device is configured to release the aerosol in the first holding cavity when the temperature in the first holding cavity reaches the specified temperature value, thereby achieving flame retardant effect. The flame-proof portable power supply further includes the holding cavity having the first holding cavity and the second holding cavity, where the holding cavity is sealed and is configured to separate the battery pack with the electrical assembly for respective installation, which is easy to install the battery pack and the electrical assembly, may not easily damage the electrical assembly when the battery pack burns, and further avoids electrical equipment connected with the electrical assembly from burning.

Figure 1:
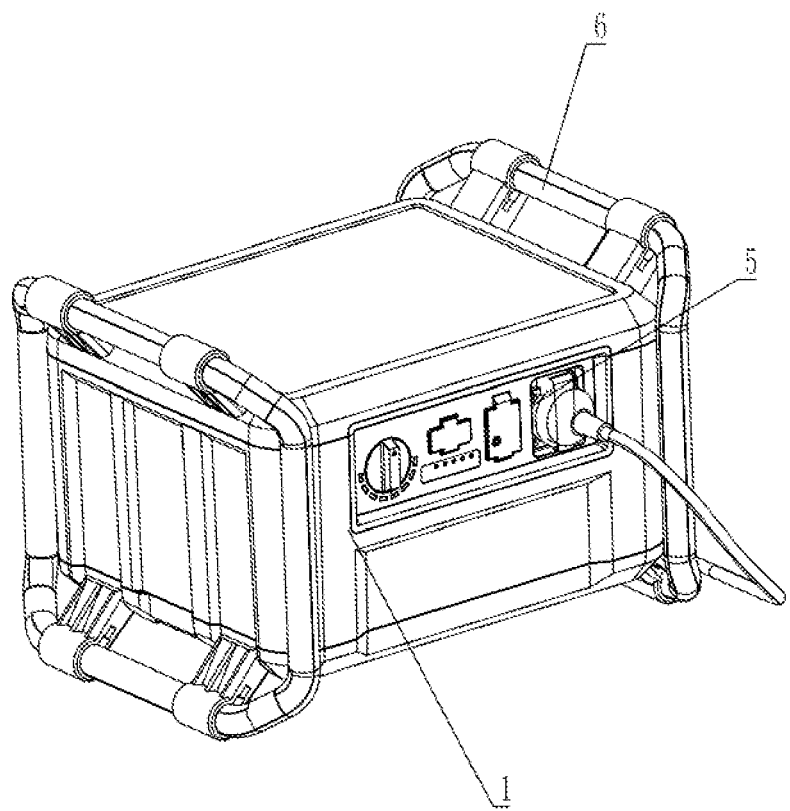
FIG. 1 is an overall structural schematic diagram of a flame-proof portable power supply according to one embodiment of the present disclosure.

Numeral reference in the drawings: metal housing 1; upper housing 11; lower housing 12; bar 121, partition plate 13; holding cavity 17; first holding cavity 14; second holding cavity 15; buffer post 16; through hole 161; threaded hole 162; support arm 163; battery pack 2; electrical assembly 3; aerosol fire extinguishing device 4; interface assembly 5; protective tube 6; bracket 7; one-way valve 8; and temperature sensing pack 9.

DETAILED DESCRIPTION OF EMBODIMENTS

Embodiments

As shown in FIGS. 1-7, the present disclosure provides a flame-proof portable power supply, including a battery pack 2, an electrical assembly 3, a metal housing 1, and an aerosol fire extinguishing device 4. A holding cavity 17 for installing the battery pack 2 and the electrical assembly 3 are formed in the metal housing 1, the battery pack 2 is electrically connected to the electrical assembly 3, and the battery pack is directly connected to the metal housing 1. The aerosol fire extinguishing device 4 is disposed in the holding cavity 17, and the aerosol fire extinguishing device 4 is configured to release aerosol in the holding cavity 17 when temperature in the holding cavity 17 reaches a specified temperature value.

Figure 2:
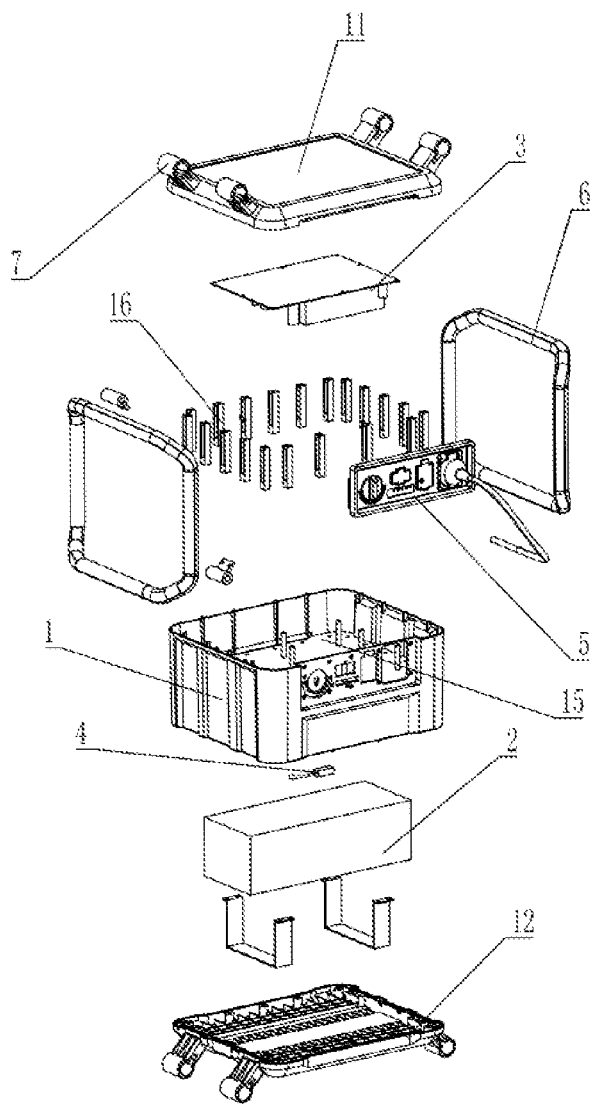
FIG. 2 is a exploded structural schematic diagram of the flame-proof portable power supply according to one embodiment of the present disclosure.
Figure 3:
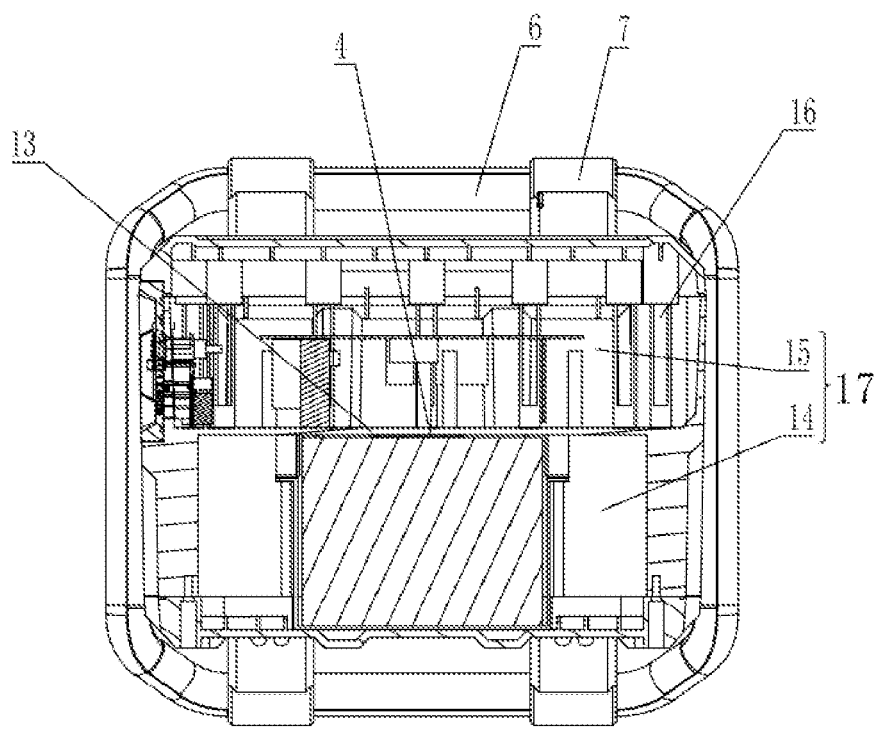
FIG. 3 is a cross-sectional structural schematic diagram of the flame-proof portable power supply according to one embodiment of the present disclosure.
Figure 4:
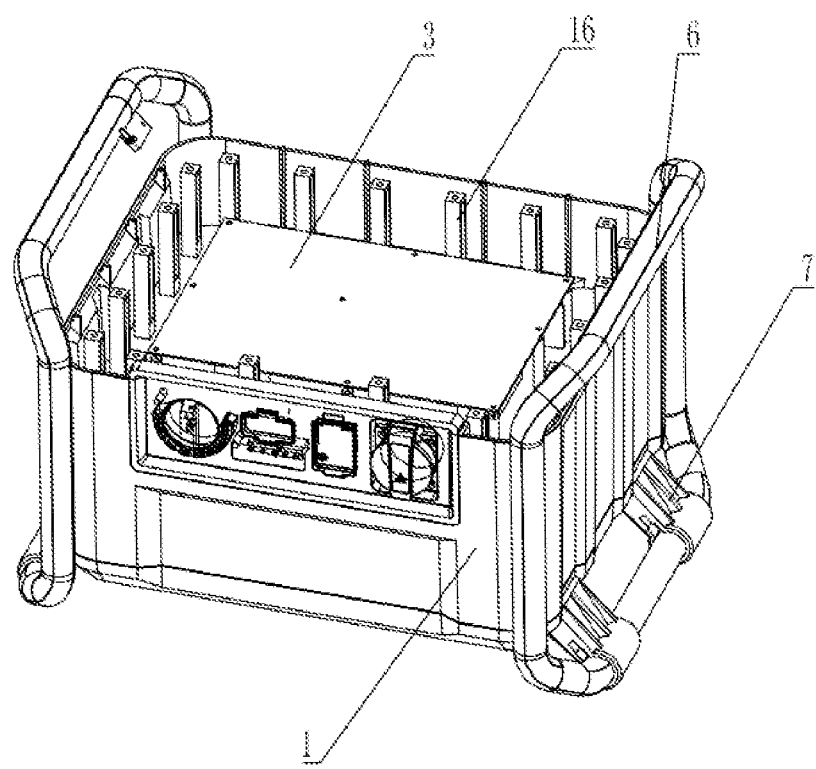
FIG. 4 is a schematic diagram of a partial internal structure of the flame-proof portable power supply according to one embodiment of the present disclosure.
Figure 5:
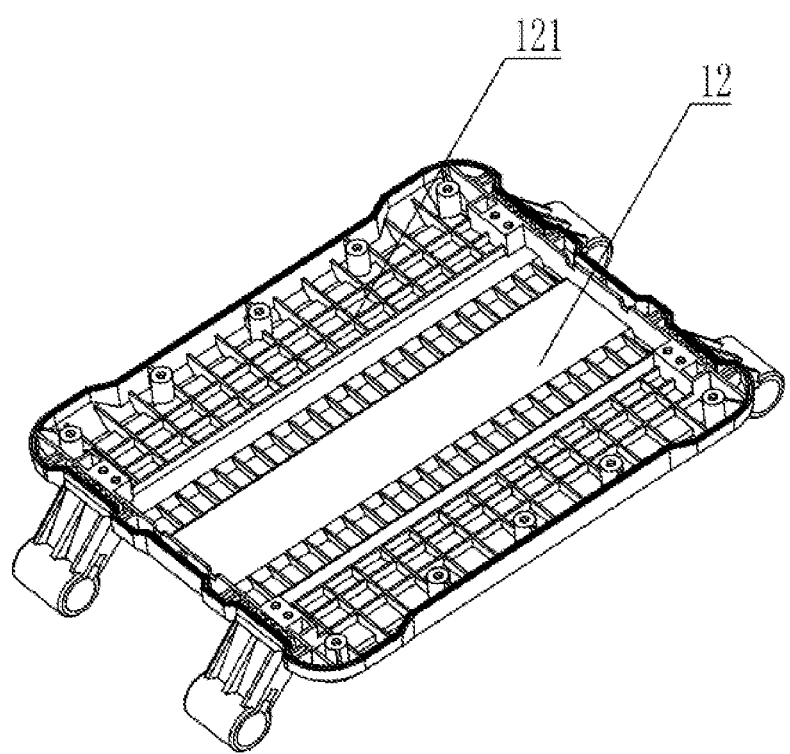
FIG. 5 is a structural schematic diagram of a lower housing of a metal housing of the flame-proof portable power supply according to one embodiment of the present disclosure.
Figure 6:
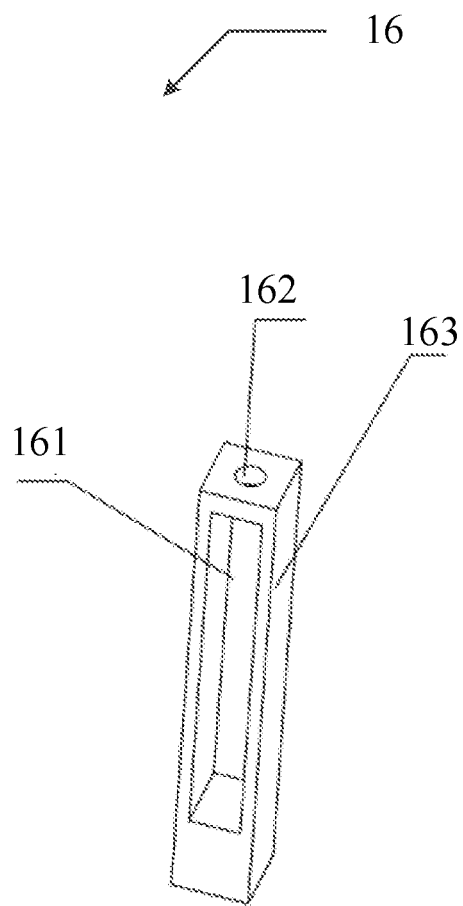
FIG. 6 is a structural schematic diagram of a buffer post of the flame-proof portable power supply according to one embodiment of the present disclosure.

As shown in FIGS. 1-3, in the embodiment, the metal housing 1 may be in a shape of square or other shapes, and the metal housing 1 is made of an aluminum alloy material, for example, aviation aluminum, etc. On the one hand, the aluminum alloy has relatively light weight and is not easily corroded, and on the other hand, the aluminum alloy has good thermal conductivity, therefore, the heat generated by the battery pack 2 may be better dissipated to external air through the metal housing 1. A partition plate 13 is disposed in the holding cavity 17 of the metal housing 1, and the partition plate 13 divides an inner space of the metal housing 1 into a first holding cavity 14 at a lower layer of the metal housing 1 and a second holding cavity 15 at an upper layer of the metal housing 1. The first holding cavity 14 is configured to install the battery pack 2, and the battery pack 2 is fixed in the first holding cavity 14 through a plurality of brackets 7. An outer peripheral wall of the partition plate 13 extends in opposite directions from both sides to form a first perimeter wall of the first holding cavity 14 and a second perimeter wall of the second holding cavity 15, and the first perimeter wall and the second perimeter wall respectively transfer heat from the first holding cavity 14 and the second holding cavity 15 to external air, to lower the temperature, caused by the heat generated by the battery pack 2 or the electrical assembly 3, in the first holding cavity or the second holding cavity. The battery pack 2 is directly connected to a lower housing 12 of the metal housing 1, and the battery pack 2 is directly connected to the metal housing 1 for transferring the heat generated therein to the metal housing 1 through heat radiation and heat conduction, and an amount of the heat generated by the battery pack 2 under normal heating conditions can be transferred through the metal housing 1, thereby achieving temperature reduction and heat dissipation. In some embodiments, a plurality of bars 121 are disposed on the lower housing 12 of the metal housing 1, and the plurality of the bars 121 are connected with the battery pack 2, and a gap is formed between adjacent two of the plurality of the bars 121, which makes the heat to be dissipated through the gap between the adjacent two of the plurality of the bars 121, rather than being concentrated in a same position in the metal housing, thereby achieving better heat dissipation.

As shown in FIGS. 1-5, the second holding cavity is configured to install the electrical assembly 3. The electrical assembly 3 includes an electrical connector for connecting the battery pack 2, a voltage-to-current conversion component, a circuit board, etc., and the electrical assembly is configured to control input and output of the power supply. The electrical connector connected with the battery pack 2 directly pass through the partition plate 13, a gap where the electrical connector intersects with the partition plate 13 is sealed, so that the first holding cavity 14 and the second holding cavity 15 are separated from each other, which prevents the heat in the first holding cavity 14 from directly transferring to the second holding cavity 15 through the gap where the electrical connector intersects with the partition plate 13 or a through hole 161.

In some embodiments, a plurality of buffer posts 16 for receiving impact from an upper housing 11 of the metal housing 1 are annularly disposed in the second holding cavity 15 along an inner side of the second peripheral wall of the second holding cavity 15, a first end of each of the plurality of the buffer posts 16 is fixed on the partition plate 13, and a second end of each of the plurality of the buffer posts 16 is connected to the upper housing 11 of the metal housing 1. Each of the plurality of the buffer posts 16 includes a post body, a long-striped through hole 161 is defined on a middle portion of the post body of each of the plurality of the buffer posts, and an elastic support arm 163 for buffering is disposed on both sides of the long-striped through hole 161, which provides each of the plurality of the buffer posts 16 a certain elastic deformation capacity, and each of the plurality of the buffer posts 16 may absorb a certain impact force when the metal housing 1 directly impacts the ground, thereby effectively protecting stability of internal components. A threaded hole 162 is defined on a top of each of the plurality of the buffer posts 16, the threaded hole 162 is connected to the long-striped through hole 161, and the threaded hole 162 is configured to connect with the upper housing 11 of the metal housing 1 through a bolt or a screw, and the bolt or the screw is capable of inserting into the long-striped through hole 161, so that resistance during thread locking may be reduced. An interface assembly 5, a switch, and a voltage regulator are disposed on one side of the second holding cavity 15, and the interface assembly 5 includes an input interface, a plurality of output interfaces, etc. The interface assembly 5 is provided with a seal on the metal housing 1 to prevent water from entering from the input interface.

In some embodiments, a temperature sensor is disposed in the first holding cavity 14, and the temperature sensor is electrically connected to the electrical assembly 3.

The aerosol fire extinguishing device 4 includes the temperature sensor, a control device, and an aerosol storage device. The control device is connected with the temperature sensor and the aerosol storage device, and the control device is electrically connected to the electrical assembly. The electrical assembly includes a main control board and a plurality of output interfaces, the main control board is electrically connected to the battery pack and the plurality of the output interfaces. The main control board is configured to execute following steps:

obtaining a temperature and an output power of the battery pack at current moment;

obtaining temperatures of the battery pack at multiple historical moments at the output power;

fitting the temperature of the battery pack at the current moment and the temperatures of the battery pack at the multiple historical moments to obtain a curve of temperatures of the battery pack changing with time at the output power;

estimating a time interval required for the battery pack to reach a set temperature value according to the curve of the temperatures of the battery pack changing with time at the output power, and the set temperature value is less than the specified temperature value;

sending a warning alert when the time interval required for the battery pack to reach the set temperature value is less than a first set time interval and greater than or equal to a second set time interval;

obtaining output interfaces currently in an output state and a priority of each of the output interfaces currently in the output state when the time interval required for the battery pack to reach the set temperature value is less than the second set time interval; and controlling an output interface having a lowest priority to stop outputting voltage or control the aerosol fire extinguishing device 4 to release the aerosol.

The temperature of the the battery pack is monitored in real time through the above steps. The on/off of different output interfaces is controlled according to temperature changes of the the battery pack, the output interface having lower priority is off when the temperature of the the battery pack increases to reduce the output power for preventing the battery pack from continuing to heat up at high output power. The aerosol fire extinguishing device 4 is directly controlled to release aerosol when the temperature of the battery pack is excess. Under the steps that the main control board is configured to execute, priorities of the output interfaces may be sequentially determined according to magnitudes of output power or the importance thereof, and the output interfaces are turned off one by one according to orders of the priorities of the output interfaces when the temperature of the battery pack is continuously increased. In the steps that the main control board is configured to execute, a certain processing time may be given to users by sending a warning alert first and then controlling the output interfaces to be off, when the users cannot process or cannot process in time, the on/off of the output interfaces can be controlled to provide the users a reaction time and prevent accidents caused by sudden power failure. In another embodiment, the power supply is interlocked with the aerosol fire extinguishing device 4 to independently control the aerosol fire extinguishing device 4 to start and release aerosols or control the aerosol fire extinguishing device 4 to release aerosols while stopping outputting voltage, which provides dual protection for improving security. In this embodiment, the aerosol fire extinguishing device 4 is operated by an electronic control device, which is the prior art and is not described herein.

Specially, the first set time interval is inversely proportional to the output power of the battery pack 2, and the second set time interval is inversely proportional to the output power of the battery pack 2, which may improve safety of the battery pack 2, since the higher the output power is, the faster the battery pack heats up, and the shorter the reaction time is.

In some embodiments, the main control board is further configured to execute following steps:
monitoring the temperature of the battery pack at the current moment;
obtaining an instantaneous temperature change rate of the battery pack according to the temperature of battery pack at the current moment and a temperature of the battery pack at a previous moment;
controlling all of the plurality of the output interfaces to stop outputting the voltage or control the aerosol fire extinguishing device 4 to release the aerosol when the instantaneous temperature change rate of the battery pack is greater than a preset change threshold of a temperature change rate of the battery pack.

The output of the output interfaces is directly off when the temperature of the battery pack quickly increases through the above steps, so that the power supply is turned off, the output power is quickly reduced, and the aerosol fire extinguishing device 4 is controlled to release the aerosols, so as to achieve emergency protection.

The aerosol fire extinguishing device 4 is disposed in the first holding cavity 14, and the aerosol fire extinguishing device 4 is disposed below the partition plate 13. The aerosol fire extinguishing device 4 may sense and detect the temperature in the first holding cavity 14, the aerosol fire extinguishing device 4 may explode when the temperature in the first holding cavity reaches a specified temperature value, and the aerosols are spread in the first holding cavity 14 for extinguishing open fires and cooling the battery pack 2. The fire extinguishing principle of the aerosol fire extinguishing device 4 is a synergistic effect of several fire extinguishing mechanisms, such as a cooling and fire extinguishing effect, a gas-phase chemical inhibition effect, and a solid-phase chemical inhibition effect, which performs heat absorption and decomposition. The aerosols include a strontium nitrate, a potassium nitrate, a dicyandiamide, and a resin, where the strontium nitrate and the potassium nitrate are oxidizing agents, the dicyandiamide is a reducing agent, the resin is an adhesive, and the ratio of materials contained in the aerosol is sequentially 55% of the strontium nitrate, 20% of the potassium nitrate, 15% of the dicyandiamide, and 10% of the resin.

In some embodiments, the aerosol fire extinguishing device 4 may be provided with various solutions. For example, in one of the embodiments, the aerosol fire extinguishing device 4 includes temperature-sensitive wires and an aerosol storage device, the temperature-sensitive wires are exposed in the first holding cavity 14, and the temperature-sensitive wires are configured to spread the aerosols in the aerosol storage device when the temperature-sensitive wires sense that the temperature in the first holding cavity 14 reaches the specified temperature value. Specifically, the aerosols in the aerosol storage device may be spread when the temperature in the first holding cavity 14 reaches 120° C., which is due to a fact that an internal diaphragm of the battery may be shrinked when the temperature of the battery in the battery pack 2 reaches 120° C.-130° C., and positive and negative electrodes inside the battery are short-circuited to cause burning. The working principle of the aerosol fire extinguishing device 4 is as follows: when the battery pack 2 in the first holding cavity 14 burns or the temperature in the first holding cavity 14 reaches 120° C. or above, the aerosol fire extinguishing device ignites the temperature-sensitive wires when being exposed to an open fire, thereby activating the aerosol generating agent in the aerosol fire extinguishing device, and the aerosol generating agent decomposes a chemical coolant by heat released through a redox reaction, the aerosol generating agent expands in the aerosol storage device and stretches the aerosol storage device, so that the aerosols spread in the first holding cavity 14, thereby enabling the aerosol generating agent and the coolant to jointly extinguish the fires. In this embodiment, the temperature-sensitive wires are arranged at an easy-to-fire position in an S-shaped manner and keeps a safe distance from electrically charged equipment. The solution has the advantages that the aerosol fire extinguishing device 4 has a small size, is stored under normal pressure, does not need to lay a pipe network, has high fire extinguishing speed, and has no dead angle, and use of the aerosol fire extinguishing device is non-toxic, non-corrosive, and does not damage the atmospheric ozone layer.

In another embodiment, the aerosol fire extinguishing device 4 includes a temperature sensor, a control device, and an aerosol storage device. The control device is electrically connected to the temperature sensor, and the control device is configured to control the aerosol fire extinguishing device 4 to release the aerosols stored in the aerosol storage device when the temperature sensed by the temperature sensor is greater than the specified temperature value.

As shown in FIGS. 1-3, in some embodiments, protective tubes are disposed on two opposite outer sides of the metal housing 1, and each of the protective tubes includes a first protective tube and a second protective tube, the first protective tube is disposed on the upper housing of the metal housing in a first splay shape with upper segments intersected and a lower end opening gradually enlarged, and the second protective tube is disposed on a lower housing of the metal housing in a second splay shape with lower segments intersected and an upper end opening gradually enlarged, so that the metal housing has a certain distance from a placing plane when being placed. Specifically, the protective tubes are spliced by a plurality of hollow tubes, in which the first protection tube in the first splay shape is formed by splicing the plurality of the hollow tubes on the upper housing 11 of the metal housing 1, the second protection tube in the second splay shape is formed by splicing the plurality of the hollow tubes on the lower housing 11 of the metal housing 1. The protective tubes are fixed on the plurality of the brackets 7 by screws, and the plurality of the brackets 7 are fixed to the metal housing 1. Through the arrangement of the protection tubes 6, a lowest surface of the power supply and a plane where the power supply is placed may be kept at a certain distance no matter which surface of the power supply faces downwards. On the one hand, industrial waterproof effect is improved, and on the other hand, anti-falling impact capability is further improved. Moreover, multiple power supplies are convenient to be stacked.

In combination with experimental data shown in Table 1 below, in another preferred embodiment, a total mass of aerosol generating agent contained in the aerosol fire extinguishing device 4 and a space volume of the first holding cavity 14 satisfy a relationship of 0.001 g/L≤A/B≤0.1 g/L, where A is the total mass of the aerosol generating agent, and B is the space volume of the first holding cavity 14. It can be concluded from the experimental data that the fire is effectively extinguished and quickly extinguished after the battery pack 2 is on fire if the relationship of 0.001 g/L≤A/B≤0.1 g/L is satisfied.

TABLE 1

|  | A/B (g/L) | Fire condition of battery box |
|---|---|---|
| Embodiment 1 | 0.01 | The fire in the battery box is extinguished in 5 S after first thermal runaway, and the second thermal runaway occurs in the box after 380 S, and the fire reignites, then the fire is extinguished in 10 S. |
| Embodiment 2 | 0.02 | The fire in the battery box is extinguished in 5 S after first thermal runaway, and the second thermal runaway occurs in the box after 370 S, and the fire reignites, then the fire is extinguished in 10 S. |
| Embodiment 3 | 0.03 | No open fire inside the battery box. |
| Embodiment 4 | 0.05 | No open fire inside the battery box. |
| Embodiment 5 | 0.1 | No open fire inside the battery box. |
| Embodiment 6 | 0.15 | No open fire inside the battery box. An amount of gas produced in the battery box is large, and the cover body of the battery box is destroyed. |
| Embodiment 7 | 0.2 | No open fire inside the battery box. An amount of gas produced in the battery box is large, and the cover body of the battery box is destroyed. |
| Embodiment 8 | 0.04 | No open fire inside the battery box. |
| Embodiment 9 | 0.06 | No open fire inside the battery box. |
| Embodiment 10 | 0.1 | No open fire inside the battery box. |
| Embodiment 11 | 0.2 | No open fire inside the battery box. An amount of gas produced in the battery box is large, and the cover body of the battery box is destroyed. |
| Embodiment 12 | 0.04 | No open fire inside the battery box. |
| Embodiment 13 | 0.06 | No open fire inside the battery box. |
| Embodiment 14 | 0.1 | No open fire inside the battery box. |
| Embodiment 15 | 0.2 | No open fire inside the battery box. An amount of gas produced in the battery box is large, and the cover body of the battery box is destroyed. |
| Embodiment 16 | 0.03 | No open fire inside the battery box. |
| Embodiment 17 | 0.05 | No open fire inside the battery box. |
| Embodiment 18 | 0.1 | No open fire inside the battery box. |
| Embodiment 19 | 0.15 | No open fire inside the battery box. |
| Embodiment 20 | 0.03 | The fire in the battery box is extinguished in 7 S after first thermal runaway, and the second thermal runaway occurs in the box after 370 S, and the fire reignites, and then the fire is extinguished in 10 S. |
| Embodiment 21 | 0.05 | No open fire inside the battery box. |
| Embodiment 22 | 0.1 | No open fire inside the battery box. |
| Embodiment 23 | 0.15 | No open fire inside the battery box. An amount of gas produced in the battery box is large, and the cover body of the battery box is destroyed. |
| Embodiment 24 | 0.03 | The fire in the battery box is extinguished in 7 S after first thermal runaway, and the second thermal runaway occurs in the box after 370 S, and the fire reignites, then the fire is extinguished in 10 S. |
| Embodiment 25 | 0.05 | No open fire inside the battery box. |
| Embodiment 26 | 0.075 | No open fire inside the battery box. |
| Embodiment 27 | 0.15 | No open fire inside the battery box. An amount of gas produced in the battery box is large, and the cover body of the battery box is destroyed. |
| Embodiment 28 | 0.25 | No open fire inside the battery box. |
| Embodiment 29 | 0.5 | No open fire inside the battery box. |
| Comparative Embodiment 1 | 0.01 | The battery box is on fire and then is extinguished after thermal runaway of a battery cell. |
| Comparative Embodiment 2 | 0.02 | The battery box is on fire and then is extinguished after thermal runaway of a battery cell. |
| Comparative Embodiment 3 | / | The battery box is on fire after thermal runaway of the battery cell, and the box body is burned through. |
| Comparative Embodiment 4 | / | The battery box is on fire after thermal runaway of the battery cell, and the box body is burned through. |
| Comparative Embodiment 5 | 0.02 | The battery box is on fire and then is extinguished after thermal runaway of a battery cell. |
| Comparative Embodiment 6 | 0.02 | The battery box is on fire and then is extinguished after thermal runaway of a battery cell. |

TABLE 1-continued

| | A/B (g/L) | Fire condition of battery box |
|---|---|---|
| Comparative Embodiment 7 | / | The battery box is on fire after thermal runaway of the battery cell, and the box body is burned through. |
| Comparative Embodiment 8 | 0.025 | The battery box is on fire and is extinguished after thermal runaway of a battery cell. |
| Comparative Embodiment 9 | / | The battery box is on fire after thermal runaway of the battery cell, and the box body is burned through. |

Figure 7:
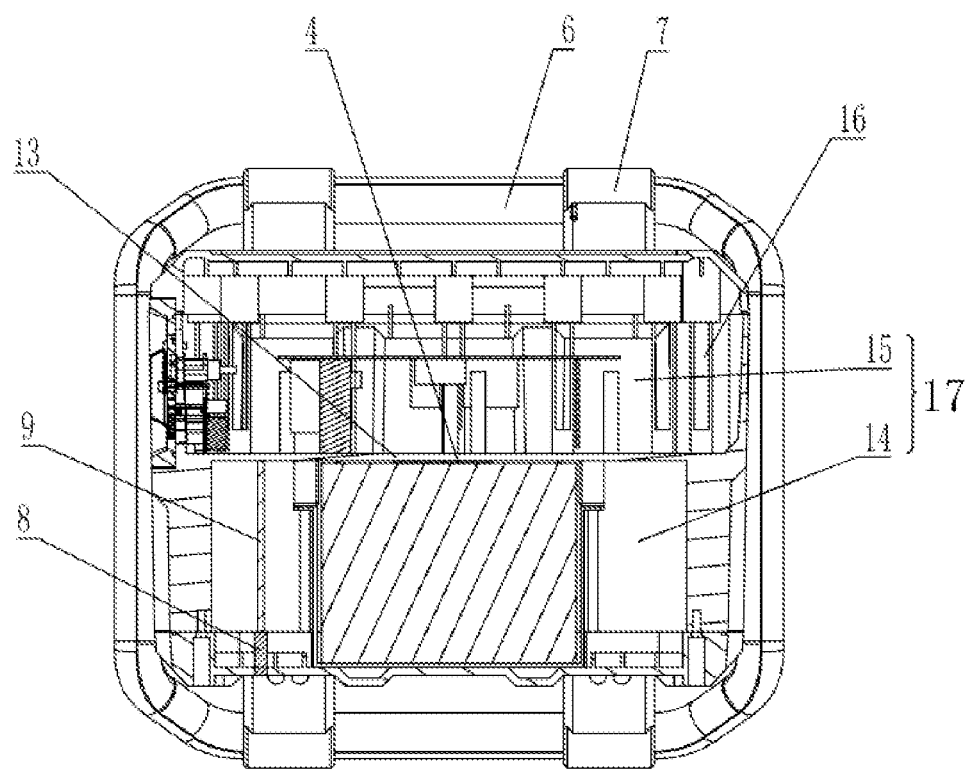
FIG. 7 is another cross-sectional structural schematic diagram of the flame-proof portable power supply according to one embodiment of the present disclosure.

As shown in FIG. 7, in some preferred embodiments, in order to prevent the explosion of the power supply caused by an excessive air pressure in the first holding cavity 14 after the aerosol spreads in the first cavity 1, a safety port 8 is defined on the lower housing 11 of the metal housing 1 of the first holding cavity 14, and the safety port 8 is provided with a one-way valve, for example, a one-way air valve. When air pressure in the first holding cavity 14 reaches a certain value, the one-way air valve opens to relieve the air pressure in the first holding cavity 14, and when the air pressure in the first holding cavity 14 is low, the one-way air valve is closed for automatically preserving the air pressure in the first holding cavity 14. The safety port 8 automatically opens to relieve the air pressure in the first holding cavity 14 when the air pressure inside the first holding cavity 14 is too large. The arrangement of the safety port 8 not only effectively solves a problem that the air pressure in the first holding cavity 14 is too large, but also does not affect the waterproof effect. In other embodiments, the safety port 8 may also be mechanically opened, a safety cover is disposed on the safety port 8, the safety cover may move at a first position of the safety port and a second position of the safety port, when the safety cover is at the first position, the safety port 8 is closed, and when the safety cover is at the second position, the safety port 8 is opened to relieve the air pressure in the first holding cavity 14. Specifically, a temperature sensing pack 9 is disposed below the safety cover, and the temperature sensing pack 9 is disposed on the battery pack. A length of the temperature sensing pack 9 is changed according to changes of the temperature in the first holding cavity 14. When the temperature in the first holding cavity 14 increases to a certain value, a push rod of the temperature sensing pack 9 is extended to push the safety cover from the first position to the second position, so as to open the safety port 8. When the temperature in the first holding cavity 14 drops, the push rod of the temperature sensing pack 9 retracts to original length, the safety cover returns to the first position, and the safety port 8 is closed, and the opening and closing of the safety port 8 is automatically controlled through the above solution. The temperature sensing pack 9 is a prior art, for example, the temperature sensing pack described in the foreign application publication having a publication number of CN 100557541 C, which is not be described herein.

The present disclosure provides the flame-proof portable power supply has following advantages:
1. The flame-proof portable power supply dissipates heat without use of the fan, has a small size, and a housing in which is fully sealed to have good dust-proof;
2. The aerosol fire extinguishing device of the flame-proof portable power supply effectively avoids occurrence of safety accidents;
3. An overall structure of the flame-proof portable power supply is easy for installation.

The above are only the referred embodiments of the present disclosure. It should be noted that, the protection scope of the present disclosure is not limited thereto. All technical solutions under ideas of the present disclosure belong to the protection scope of the present disclosure.

The above description of the drawings in the above embodiments only shows some embodiments of the present disclosure, which should not be regarded as limiting the protection scope of the present disclosure. For the person of ordinary skill in the art, other relevant drawings can be obtained from these drawings without any creative effort.

What is claimed is:

1. A flame-proof portable power supply, comprising:
a battery pack;
an electrical assembly;
a metal housing; and
an aerosol fire extinguishing device;
wherein a holding cavity for installing the battery pack and the electrical assembly is formed in the metal housing, the battery pack is electrically connected to the electrical assembly, and the battery pack is directly connected to the metal housing;
the aerosol fire extinguishing device is disposed in the holding cavity, and the aerosol fire extinguishing device is configured to release aerosol in the holding cavity when temperature in the holding cavity reaches a specified temperature value;
protective tubes are disposed on two opposite outer sides of the metal housing, and each of the protective tubes comprises a first protective tube and a second protective tube; and
the first protective tube is disposed on the upper housing of the metal housing in a first splay shape, and the second protective tube is disposed on a lower housing of the metal housing in a second splay shape, so that the metal housing has a certain distance from a placing plane when being placed.

2. The flame-proof portable power supply according to claim 1, wherein the holding cavity comprises a first holding cavity and a second holding cavity; the battery pack is disposed in the first holding cavity, and the battery pack is directly connected to the metal housing; the electrical assembly is disposed in the second holding cavity; and
the aerosol fire extinguishing device is disposed in the first holding cavity, and the aerosol fire extinguishing device is configured to release the aerosol in the first holding cavity when temperature in the first holding cavity reaches the specified temperature value.

3. The flame-proof portable power supply according to claim 2, wherein the metal housing comprises a partition plate, an outer peripheral wall of the partition plate extends in opposite directions from both sides to form a first perimeter wall of the first holding cavity and a second perimeter wall of the second holding cavity, and the first perimeter wall and the second perimeter wall respectively transfer heat from the first holding cavity and the second holding cavity to external air.

4. The flame-proof portable power supply according to claim 3, wherein a plurality of buffer posts for receiving impact from an upper housing of the metal housing are annularly disposed in the second holding cavity along an inner side of the second peripheral wall of the second holding cavity, and a first end of each of the plurality of the buffer posts is fixed on the partition plate and a second end of each of the plurality of the buffer posts is connected to the upper housing of the metal housing; and each of the plurality of the buffer posts comprises a post body, and a long-striped through hole is defined on a middle portion of the post body of each of the plurality of the buffer posts to form an elastic support arm for buffering.

5. The flame-proof portable power supply according to claim 1, wherein the aerosol fire extinguishing device comprises a temperature sensor, a control device, and an aerosol storage device; the control device is connected to the temperature sensor and the aerosol storage device, and the control device is electrically connected to the electrical assembly; and the electrical assembly comprises a main control board and a plurality of output interfaces, the main control board is electrically connected to the battery pack and the main control board is electrically connected to the plurality of the output interfaces; and the main control board is configured sequentially to:

obtain a temperature and an output power of the battery pack at current moment;

obtain temperatures of the battery pack at multiple historical moments at the output power;

fit the temperature of the battery pack at the current moment and the temperatures of the battery pack at the multiple historical moments to obtain a curve of temperatures of the battery pack changing with time at the output power;

estimate a time interval required for the battery pack to reach a set temperature value according to the curve of the temperatures of the battery pack changing with time at the output power, and the set temperature value is less than the specified temperature value;

send a warning alert when the time interval required for the battery pack to reach the set temperature value is less than a first set time interval and greater than or equal to a second set time interval;

obtain output interfaces currently in an output state and a priority of each of the output interfaces currently in the output state when the time interval required for the battery pack to reach the set temperature value is less than the second set time interval;

control an output interface having a lowest priority to stop outputting voltage or control the aerosol fire extinguishing device to release the aerosol.

6. The flame-proof portable power supply according to claim 5, wherein the first set time interval is inversely proportional to the output power of the battery pack, and the second set time interval is inversely proportional to the output power of the battery pack.

7. The flame-proof portable power supply according to claim 5, wherein the main control board is further configured to:

monitor the temperature of the battery pack at the current moment;

obtain an instantaneous temperature change rate of the battery pack according to the temperature of the battery pack at the current moment and a temperature of the battery pack at a previous moment;

control all of the plurality of output interfaces to stop outputting the voltage or control the aerosol fire extinguishing device to release the aerosol when the instantaneous temperature change rate of the battery pack is greater than a preset change threshold of a temperature change rate of the battery pack.

8. The flame-proof portable power supply according to claim 1, wherein a safety port is defined on the first holding cavity, a safety cover is disposed on the safety port, and a temperature sensing pack is disposed below the safety cover; and the temperature sensing pack comprises a pushing rod, and the pushing rod is configured to push the safety cover to open or close the safety port according to temperature changes in the first holding cavity, and the temperature sensing pack is disposed on the battery pack.

9. The flame-proof portable power supply according to claim 2, wherein a total mass of aerosol generating agent contained in the aerosol fire extinguishing device and a space volume of the first holding cavity satisfy a relationship of $0.001 \text{ g/L} \le A/B \le 0.1 \text{ g/L}$, and A is the total mass of the aerosol generating agent, and B is the space volume of the first holding cavity.

10. A flame-proof portable power supply, comprising:

a battery pack;

an electrical assembly;

a metal housing; and an aerosol fire extinguishing device;

wherein a holding cavity for installing the battery pack and the electrical assembly is formed in the metal housing, the battery pack is electrically connected to the electrical assembly, and the battery pack is directly connected to the metal housing;

the aerosol fire extinguishing device is disposed in the holding cavity, and the aerosol fire extinguishing device is configured to release aerosol in the holding cavity when temperature in the holding cavity reaches a specified temperature value;

a safety port is defined on the first holding cavity, a safety cover is disposed on the safety port, and a temperature sensing pack is disposed below the safety cover; and the temperature sensing pack comprises a pushing rod, and the pushing rod is configured to push the safety cover to open or close the safety port according to temperature changes in the first holding cavity, and the temperature sensing pack is disposed on the battery pack.

11. A flame-proof portable power supply, comprising:

a battery pack;

an electrical assembly;

a metal housing; and an aerosol fire extinguishing device;

wherein a holding cavity for installing the battery pack and the electrical assembly is formed in the metal housing, the battery pack is electrically connected to the electrical assembly, and the battery pack is directly connected to the metal housing;

the aerosol fire extinguishing device is disposed in the holding cavity, and the aerosol fire extinguishing device is configured to release aerosol in the holding cavity when temperature in the holding cavity reaches a specified temperature value;

the holding cavity comprises a first holding cavity and a second holding cavity; the battery pack is disposed in the first holding cavity, and the battery pack is directly connected to the metal housing; the electrical assembly is disposed in the second holding cavity;

the aerosol fire extinguishing device is disposed in the first holding cavity, and the aerosol fire extinguishing device is configured to release the aerosol in the first holding cavity when temperature in the first holding cavity reaches the specified temperature value;

the metal housing comprises a partition plate, an outer peripheral wall of the partition plate extends in opposite directions from both sides to form a first perimeter wall of the first holding cavity and a second perimeter wall of the second holding cavity, and the first perimeter wall and the second perimeter wall respectively transfer heat from the first holding cavity and the second holding cavity to external air;

a plurality of buffer posts for receiving impact from an upper housing of the metal housing are annularly disposed in the second holding cavity along an inner side of the second peripheral wall of the second holding cavity, and a first end of each of the plurality of the buffer posts is fixed on the partition plate and a second end of each of the plurality of the buffer posts is connected to the upper housing of the metal housing; and each of the plurality of the buffer posts comprises a post body, and a long-striped through hole is defined on a middle portion of the post body of each of the plurality of the buffer posts to form an elastic support arm for buffering.

* * * * *